US008259385B2

(12) United States Patent
Hempstead et al.

(10) Patent No.: US 8,259,385 B2
(45) Date of Patent: Sep. 4, 2012

(54) METHODS FOR CONTROLLING WAVELENGTH-CONVERTED LIGHT SOURCES TO REDUCE SPECKLE

(75) Inventors: Martin Hempstead, Painted Post, NY (US); Rostislav Vatchev Roussev, Painted Post, NY (US); David Lee Weidman, Corning, NY (US)

(73) Assignee: Corning Incorporated, Corning, NY (US)

( * ) Notice: Subject to any disclaimer, the term of this patent is extended or adjusted under 35 U.S.C. 154(b) by 407 days.

(21) Appl. No.: 12/603,863

(22) Filed: Oct. 22, 2009

(65) Prior Publication Data

US 2011/0096390 A1  Apr. 28, 2011

(51) Int. Cl.
*G02F 1/35* (2006.01)

(52) U.S. Cl. .............. 359/326; 372/22; 372/34

(58) Field of Classification Search .......... 359/326–332; 372/21, 22, 34–36; 385/122
See application file for complete search history.

(56) References Cited

U.S. PATENT DOCUMENTS

| 6,154,310 | A  | 11/2000 | Galvanauskas et al. ...... 359/328 |
| 6,304,237 | B1 | 10/2001 | Karakawa .................. 345/84 |
| 6,774,881 | B2 | 8/2004  | Karakawa .................. 345/84 |
| 6,991,165 | B2 | 1/2006  | Tsikos et al. ............ 235/462.01 |
| 7,028,899 | B2 | 4/2006  | Tsikos et al. ............ 235/462.01 |
| 7,212,275 | B2 | 5/2007  | Ohtsuki .................... 355/67 |
| 7,322,704 | B2 | 1/2008  | Shchegrov ................. 353/94 |
| 7,357,513 | B2 | 4/2008  | Watson et al. .............. 353/31 |
| 7,359,420 | B2 | 4/2008  | Shchegrov et al. ...... 372/50.124 |
| 7,511,879 | B2 | 3/2009  | Kinoshita |
| 7,535,938 | B2* | 5/2009 | Luo et al. ................... 372/21 |
| 7,715,084 | B2* | 5/2010 | Tan et al. ................... 359/279 |
| 7,733,927 | B2* | 6/2010 | Furuya et al. ............... 372/21 |
| 7,780,311 | B2* | 8/2010 | Sumiyama et al. .......... 362/231 |
| 7,889,422 | B2* | 2/2011 | Furuya et al. ............. 359/326 |

(Continued)

OTHER PUBLICATIONS

Mizuuchi et al Article "Tuning of phase-matching wavelength in waveguide-type $LiTaO_3$ frequency doubler"; Electronics Letters, Apr. 27, 1995; vol. 31, No. 9; p. 727-728.

(Continued)

*Primary Examiner* — Daniel Petkovsek
(74) *Attorney, Agent, or Firm* — Svetlana Z. Short

(57) ABSTRACT

A method for operating a wavelength-converted light source includes directing a pump beam having a fundamental wavelength from the laser source into an input facet of the wavelength conversion device such that a wavelength-converted output beam is emitted from an output facet of the wavelength conversion device in the field of view of an optical detector. A physical property of the wavelength conversion device is varied within individual ones of a succession of consecutive speckle reduction intervals having durations less than the integration time of the optical detector. The physical property of the wavelength conversion device is varied by an amount that is sufficient to change in a phase-matched (PM) wavelength of the wavelength conversion device. The fundamental wavelength of the pump beam is thereafter adjusted based on the change in the PM wavelength to maintain an efficiency of the wavelength conversion in the wavelength conversion device.

22 Claims, 5 Drawing Sheets

U.S. PATENT DOCUMENTS

| | | |
|---|---|---|
| 2002/0196414 A1 | 12/2002 | Manni et al. .................... 353/31 |
| 2006/0126022 A1 | 6/2006 | Govorkov et al. .............. 353/31 |
| 2007/0012777 A1 | 1/2007 | Tsikos et al. .................. 235/454 |
| 2008/0175285 A1 | 7/2008 | Hu .................................. 372/28 |
| 2008/0297731 A1 | 12/2008 | Powell et al. .................. 353/37 |
| 2009/0067459 A1 | 3/2009 | Mizuuchi et al. ............... 372/25 |
| 2009/0110013 A1 | 4/2009 | Gollier et al. .................. 372/22 |
| 2009/0122531 A1 | 5/2009 | Sumiyama et al. ........... 362/231 |

OTHER PUBLICATIONS

Gan et al Article "Tunable second harmonic generation devices with an integrated micro-heater"; Proc. of SPIE vol. 6875, 687506-1 to 687506-8.

F. Généreux, et al., "Widely tunable SHG in a PPLN using a low voltage", paper CMBB3, Conference on Lasers and Electro-Optics (CLEO) 2007, May 6-11, 2007.

\* cited by examiner

METHODS FOR CONTROLLING WAVELENGTH-CONVERTED LIGHT SOURCES TO REDUCE SPECKLE

BACKGROUND

1. Field

The present specification generally relates to wavelength-converted light sources and, more specifically, to methods for controlling wavelength-converted light sources to reduce speckle in projected images.

2. Technical Background

Laser speckle causes undesirable effects associated with the use of coherent illumination in general and laser-based projection systems in particular. Laser speckle is an undesirable random intensity variation perceived by the eye or other detection system. Speckle may result when a coherent light source is used to illuminate a rough surface such as a screen, wall, or any other object that produces a diffused reflection or transmission. Particularly, a multitude of small areas of the screen or other reflecting objects scatter light into a multitude of reflected beams with different points of origination and different propagation directions. At an observation point, such as the eyes of an observer or an optical detector such as the sensor of a camera, these reflected beams interfere constructively to form a bright spot or destructively to form a dark spot, thereby producing a random granular intensity pattern known as speckle.

The standard quantitative measure of the amount of speckle visible is speckle contrast. Speckle contrast is defined as the ratio between the standard deviation of intensity and the mean intensity detected by the eye or another optical detector. When the speckle contrast is 100% the speckle is considered to be "fully developed" which yields the lowest image quality to an observer and/or an optical detector. The human eye can detect speckle at contrast levels as low as 5% or even 1% depending on a number of variables including the wavelength of the projected light and brightness of the illumination as well as variations in perception amongst different individuals.

There is significant interest in image projectors based on coherent laser sources instead of incoherent lamps or LEDs. This is because of the potential compactness, power efficiency, brightness, color saturation and other properties afforded by laser sources. Because of the human eye's ability to detect speckle in a projected image, even modest amounts of speckle may be distracting to an observer and detract from the perceived quality of a projected image. A typical image projection system requires laser sources of three different colors which are typically red, green and blue. While red and blue laser sources are available, there is presently no practical laser source that emits at a green wavelength suitable for image projection systems. As a result, green laser sources used in projection systems generally comprise a pump laser coupled to a nonlinear wavelength conversion device which produces the desired green wavelength.

Accordingly, a need exists for alternative methods for controlling a wavelength-converted light source to reduce the perceived speckle contrast in an image projected with the wavelength-converted light source.

SUMMARY

According to one embodiment, a method for operating a light source comprising a laser source optically coupled to a wavelength conversion device includes directing a pump beam having a fundamental wavelength from the laser source into an input facet of the wavelength conversion device such that the wavelength conversion device emits a wavelength-converted output beam from an output facet of the wavelength conversion device in the field of view of an optical detector. A physical property of the wavelength conversion device is varied within individual ones of a succession of consecutive speckle reduction intervals, wherein individual speckle reduction intervals have a duration which is less than an integration time of the optical detector and the physical property of the wavelength conversion device is varied by an amount that is sufficient to effect a change in a phase-matched (PM) wavelength of the wavelength conversion device. The fundamental wavelength of the pump beam is thereafter adjusted based on the change in the PM wavelength of the wavelength conversion device to maintain an efficiency of the wavelength conversion in the wavelength conversion device.

In another embodiment, a method for operating a light source comprising a laser source optically coupled to a wavelength conversion device includes directing a pump beam having a fundamental wavelength from the laser source into an input facet of the wavelength conversion device such that the wavelength conversion device emits a wavelength-converted output beam from an output facet of the wavelength conversion device in the field of view of an optical detector. The wavelength conversion device is heated within individual ones of a succession of consecutive speckle reduction intervals, wherein individual speckle reduction intervals have a duration which is less than an integration time of the optical detector and the wavelength conversion device is heated by an amount that is sufficient to effect a change in a phase-matched (PM) wavelength of the wavelength conversion device. The fundamental wavelength of the pump beam is thereafter adjusted based on the change in the PM wavelength of the wavelength conversion device to maintain an efficiency of the wavelength conversion in the wavelength conversion device.

Additional features and advantages of the methods described herein will be set forth in the detailed description which follows, and in part will be readily apparent to those skilled in the art from that description or recognized by practicing the embodiments described herein, including the detailed description which follows, the claims, as well as the appended drawings.

It is to be understood that both the foregoing general description and the following detailed description describe various embodiments and are intended to provide an overview or framework for understanding the nature and character of the claimed subject matter. The accompanying drawings are included to provide a further understanding of the various embodiments, and are incorporated into and constitute a part of this specification. The drawings illustrate the various embodiments described herein, and together with the description serve to explain the principles and operations of the claimed subject matter.

DETAILED DESCRIPTION

Figure 1:
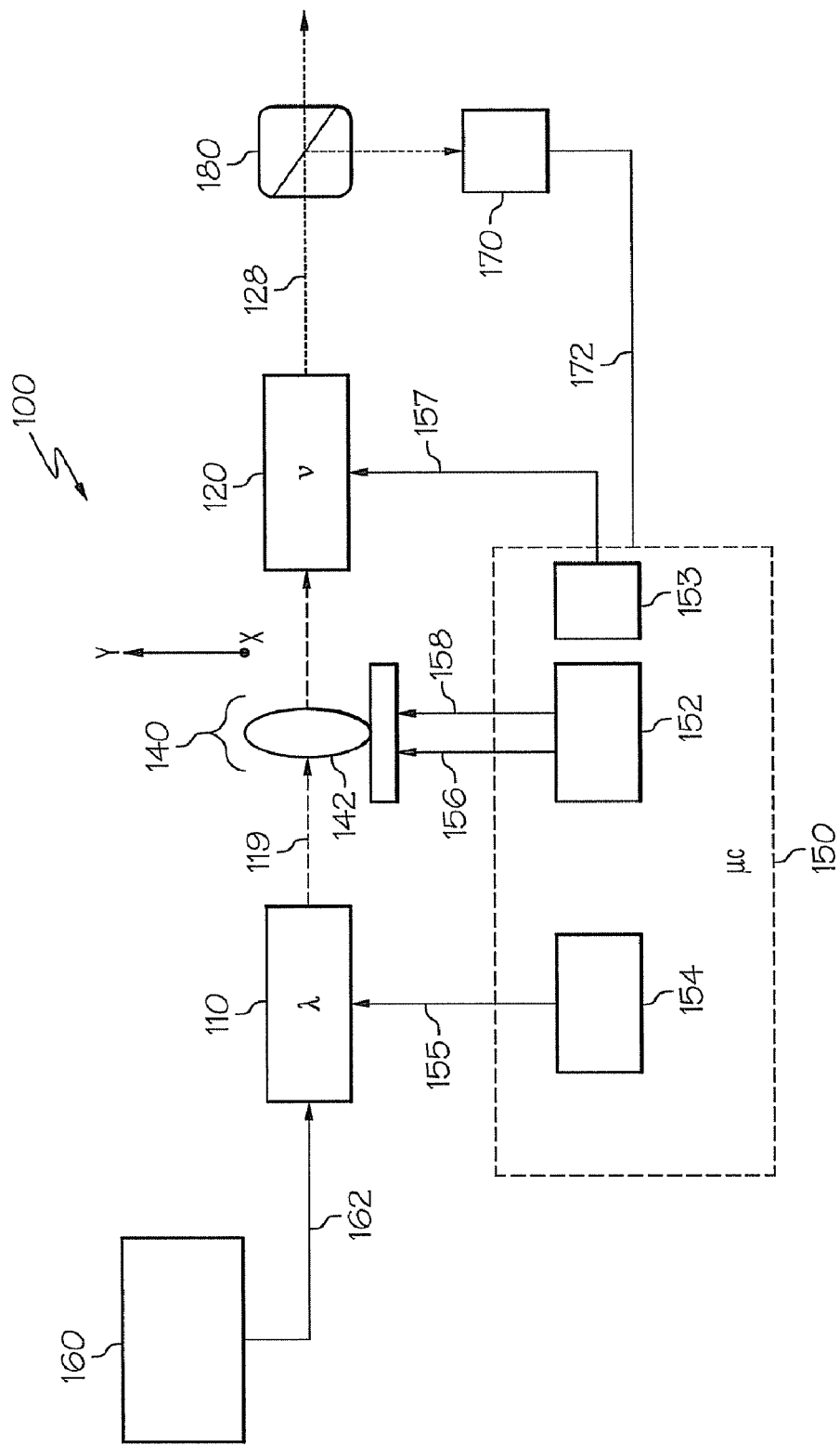
FIG. 1 is a schematic diagram of a wavelength-converted light source according to one embodiment shown and described herein.

Reference will now be made in detail to various embodiments of the method for operating a wavelength-converted light source, examples of which are illustrated in the accompanying drawings. Whenever possible, the same reference numerals will be used throughout the drawings to refer to the same or like parts. One embodiment of a wavelength-converted light source operated in accordance with the methods described herein is illustrated in FIG. 1. The wavelength-converted light source generally comprises a laser source, such as a semiconductor laser, a wavelength conversion device and a source controller. The source controller is operable to adjust a physical property of the wavelength conversion device and thereby adjust the phase-matched (PM) wavelength of the wavelength conversion device. The source controller is also operable to adjust the fundamental wavelength of the pump beam emitted by the laser source based on the change in the PM wavelength of the wavelength conversion device. Various components and configurations of the wavelength-converted light source and methods for operating the light source will be further described herein.

FIG. 1 generally depicts one embodiment of a wavelength-converted light source 100 described herein. It should be understood that the solid lines and arrows indicate the electrical interconnectivity of various components of the wavelength-converted light source. These solid lines and arrows are also indicative of electrical signals propagated between the various components including, without limitation, electronic control signals, data signals and the like. Further, it should also be understood that the dashed lines and arrows indicate light beams, such as visible light beams and/or infrared light beams, emitted by the laser source and the wavelength conversion device.

Referring initially to FIG. 1, although the general structure of the various types of wavelength-converted light sources in which the concepts of particular embodiments of the present invention can be incorporated are taught in readily available technical literature relating to the design and fabrication of frequency-or wavelength-converted laser sources, the concepts of particular embodiments of the present invention may be conveniently illustrated with general reference to the wavelength-converted light source 100 which includes, for example, a laser source 110 optically coupled to a wavelength conversion device 120. The pump beam 119 emitted by the laser source 110 may be either directly coupled into the waveguide portion of the wavelength conversion device 120 (such as when the laser source and the wavelength conversion device are proximity coupled) or coupled into the waveguide portion of wavelength conversion device 120 using adaptive optics 140 or, alternatively, fixed optics. The wavelength conversion device 120 converts the pump beam 119 into higher harmonic waves such that the wavelength conversion device emits a wavelength-converted output beam 128. This type of wavelength-converted light source is particularly useful in generating shorter wavelength laser beams from longer wavelength laser sources and can be used, for example, as a visible laser source for laser projection systems.

Figure 2:
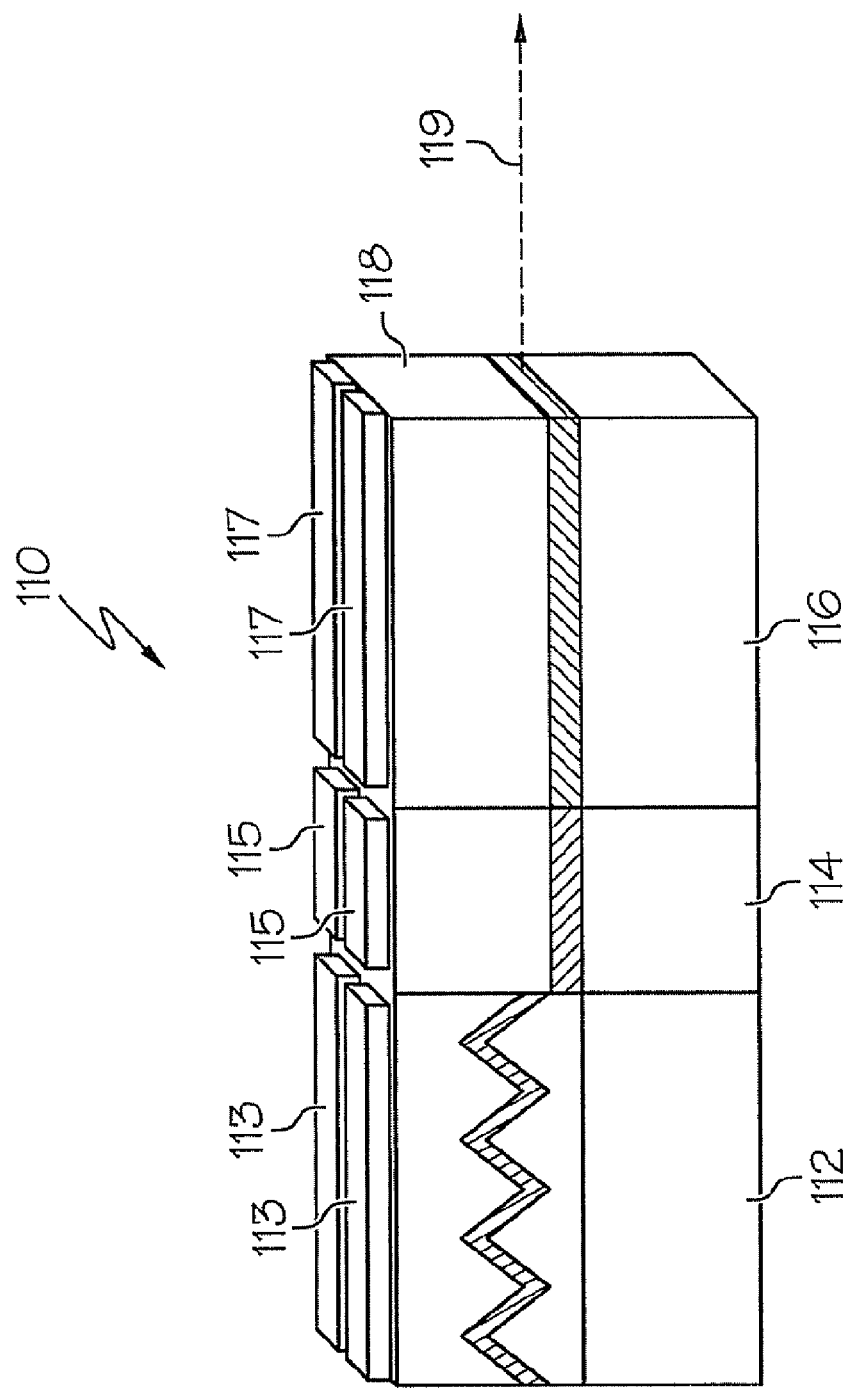
FIG. 2 depicts a laser source for use in conjunction with one or more embodiments of the light sources shown and described herein.

The laser source 110, which is schematically illustrated in FIG. 2, may generally comprise a semiconductor laser with a wavelength selective section 112, a phase matching section 114, and a gain section 116. The wavelength selective section 112, which may also be referred to as the distributed Bragg reflector or DBR section of the laser source 110, typically comprises a first order or second order Bragg grating positioned outside the active region of the laser cavity. This section provides wavelength selection, as the grating acts as a mirror whose reflection coefficient depends on wavelength. The gain section 116 of the laser source 110 provides the major optical gain of the laser and the phase matching section 114 creates an adjustable optical path length or phase shift between the gain material of the gain section 116 and the reflective portion of the wavelength selective section 112. The wavelength selective section 112 may be provided in a number of suitable alternative configurations that may or may not employ a Bragg grating.

Respective control leads 113, 115, 117 are incorporated in the wavelength selective section 112, the phase matching section 114, the gain section 116, or combinations thereof, and are merely illustrated schematically in FIG. 2. It is contemplated that the leads 113, 115, 117 may take a variety of forms. For example, the control leads 113, 115, 117 are illustrated in FIG. 2 as respective lead pairs but it is contemplated that single lead elements in one or more of the sections 112, 114, 116 will also be suitable for practicing particular embodiments of the present invention. The control leads 113, 115, 117 can be used to inject electrical current into the corresponding sections 112, 114, 116 of the laser source 110. For example, in one embodiment, current injected into the wavelength selective section 112 of the laser source 110 can be used to control the wavelength $\lambda_1$ of the pump beam 119 emitted from the output facet 118 of the laser source 110 by altering the operating properties of the laser. The injected current may be used to control the temperature of the wavelength selective section 112 and/or the index of refraction of the wavelength selective section. Accordingly, by adjusting the amount of current injected into the wavelength selective section, the wavelength of the pump beam 119 emitted by the laser source may be varied. Current injected into the phase matching section 114 or gain section 116 may be similarly used to control the output of the laser source 110.

In the embodiments of the light source 100 described herein the laser source 110 is a semiconductor DBR laser operable to emit a pump beam 119 which has a fundamental wavelength $\lambda_1$ in the infrared range. The fundamental wavelength may be about 1060 nm depending on the specific operating conditions of the DBR laser (i.e., the amount of current supplied to the wavelength selective section, gain section and/or the phase matching section and/or the temperature of the laser). However, it should be understood that the light source 100 may include other types of laser sources operable to emit pump beams with different fundamental wavelengths.

For example, in one alternative embodiment (not shown), the laser source 110 may comprise a vertical cavity surface emitting laser (VCSEL) optically coupled to the wavelength conversion device. In another alternative embodiment (not shown), the laser source 110 may be a Fabry-Perot laser optically coupled to the wavelength conversion device with an external grating.

Figure 3A:
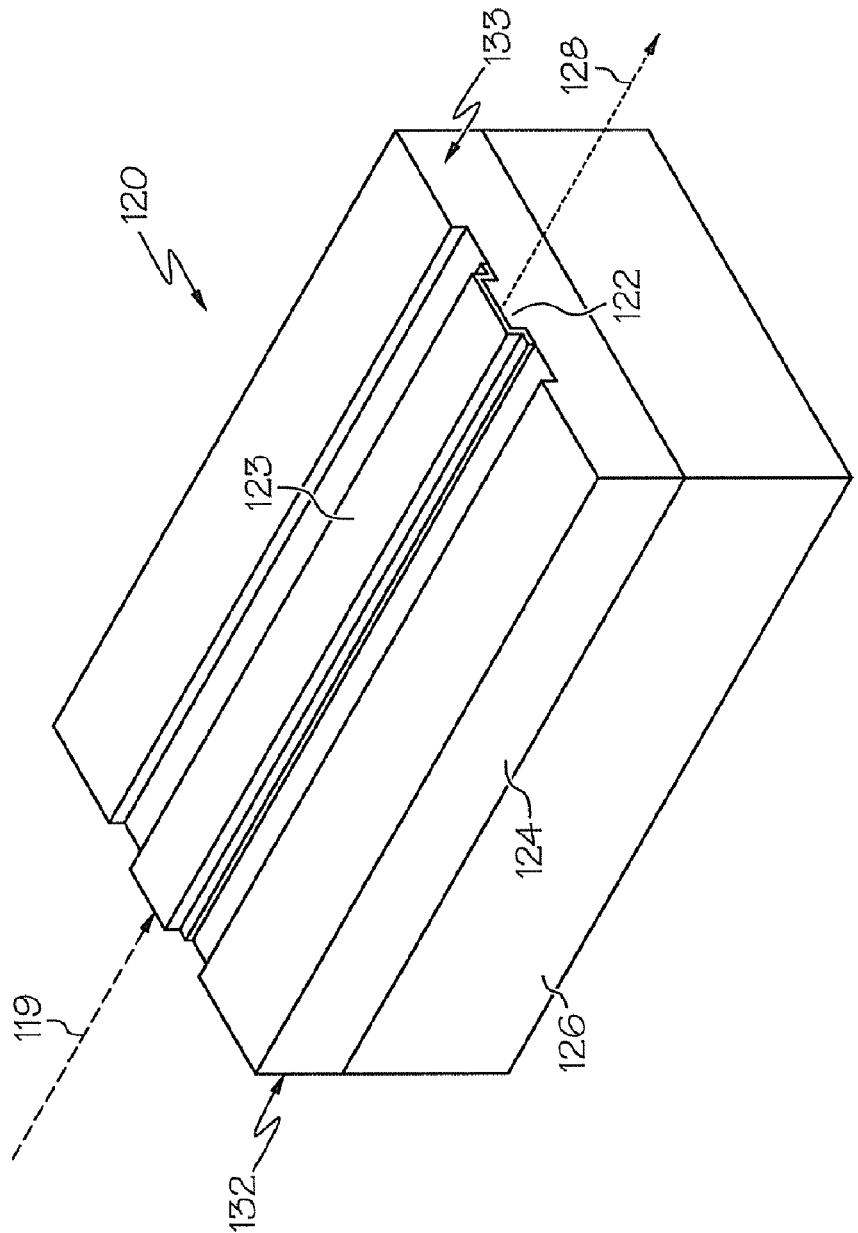
FIG. 3A depicts a wavelength conversion device for use in conjunction with one or more embodiments of the light sources shown and described herein.

Still referring to FIG. 1 in the embodiment described herein, the wavelength conversion device 120 generally comprises a non-linear optical bulk crystal material, such as a second-harmonic-generation (SHG) crystal. For example, in one embodiment, the bulk crystal material may be operable to produce higher order harmonics from a pump beam. In another embodiment, the wavelength conversion device 120 may comprise an MgO-doped, periodically poled lithium niobate (MgO:PPLN) waveguide 122, as shown in FIG. 3A. More specifically, the MgO:PPLN waveguide may be doped with about 5 mol. % MgO, although other amounts of MgO may be used. In this embodiment, the waveguide portion of the wavelength conversion device may be operable to convert the pump beam of the laser source to higher order harmonics.

While specific reference is made herein to certain types of wavelength conversion devices and/or waveguides for converting a fundamental beam to a higher order harmonic beam, it should be understood that other, similar non-linear optical materials may be used for the wavelength conversion device and/or the waveguide portion of the wavelength conversion device. For example, the bulk crystal material or the waveguide portion of the wavelength conversion device may include, without limitation, potassium titanyl phosphate (KTP), zinc-oxide doped periodically poled lithium niobate (ZnO:PPLN), lithium tantalate (LT), doped LT, near stochiometric LT, near stochiometric lithium niobate, and the like. Similarly, it will be understood that the wavelength conversion device may comprise a bulk MgO:PPLN crystal or similar non-linear optical material. Further, it should be understood that the wavelength conversion device may be a second harmonic generation (SHG) crystal or a non-linear optical crystal capable of converting light to higher order (e.g., $3^{rd}$, $4^{th}$, etc.) harmonics. It should also be understood that the wavelength conversion device and/or waveguide portion of the wavelength conversion device may be a machined waveguide, an etched waveguide, an ion-implanted waveguide or a diffused waveguide. Further, poling may be used to produce structures with domain distributions differing by design from strictly periodic. Additionally, other non-linear frequency conversion devices such as optical parametric oscillators may be used in conjunction with the speckle reduction methodologies described herein.

Figure 3B:
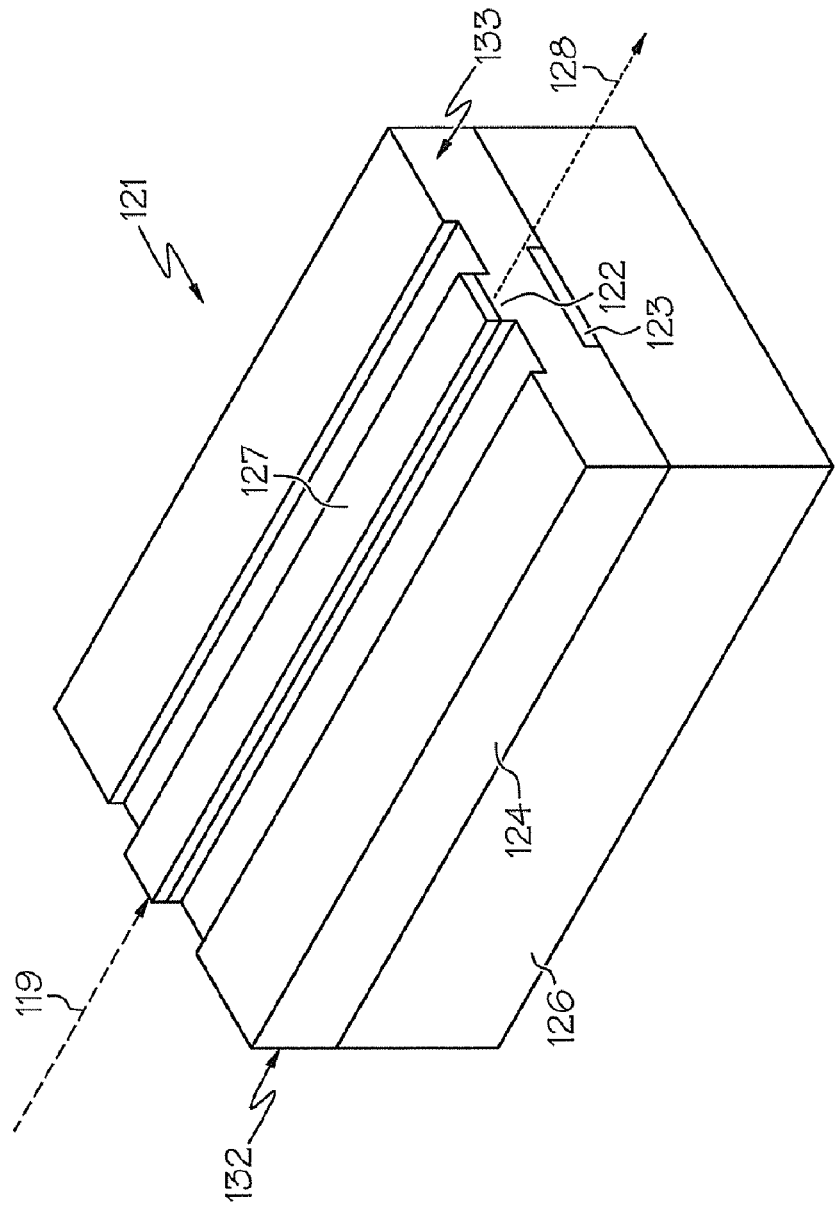
FIG. 3B depicts another embodiment of a wavelength conversion device for use in conjunction with one or more embodiments of the light sources shown and described herein.

Referring now to FIGS. 3A and 3B, two embodiments of wavelength conversion devices 120, 121 are shown. In the embodiment depicted in FIG. 3A, the wavelength conversion device 120 comprises a waveguide portion 122, specifically a ridge waveguide portion, formed on a bulk crystal material 124. The bulk crystal material 124 is disposed on a substrate 126. The bulk crystal material 124 and the waveguide portion 122 may comprise MgO-doped lithium niobate with the waveguide portion 122 formed by photolithography and etching or other, similar manufacturing techniques. Alternatively, the waveguide portion 122 may be formed within the bulk material as a buried or diffused waveguide which comprises MgO-doped lithium niobate diffused with protons, zinc, titanium or nickel, or ion implanted MgO-doped lithium niobate. The waveguide portion 122 extends between an input facet 132 and an output facet 133. In the embodiment shown in FIG. 3A, a heater 123, such as a resistive microstrip heater, may be disposed over the waveguide portion 122.

Referring to FIG. 3B, in another embodiment the heater 123 is disposed between the bulk crystal material 124 and the substrate 126. In this embodiment, the wavelength conversion device 121 may further comprise a heat sink 127 disposed over the top of the waveguide portion 122 of the wavelength conversion device 121. The heat sink 127 may assist in dissipating or conducting heat away from the waveguide portion 122 of the wavelength conversion device following heating with the heater 123.

In the embodiments shown in FIGS. 3A and 3B, the heater may be operable to heat the wavelength conversion device, specifically the waveguide portion 122 of the wavelength conversion device, to a temperature sufficient to vary a physical property of the wavelength conversion device and thereby vary the PM wavelength of the wavelength conversion device 120, as will be described in more detail herein. It is contemplated that, when the heater is a resistive heater, the resistive heater may have an efficiency of at least about 3 to 5 nm/W when utilized to vary the PM wavelength. Accordingly, for every watt of heating power the PM wavelength of the wavelength conversion device is increased from at least about 3 nm to about 5 nm.

Referring again to FIG. 3A, the wavelength conversion device 120 generally comprises an input facet 132 and an output facet 133. A waveguide portion 122 of the wavelength conversion device 120 extends between the input facet 132 to the output facet 133. When the wavelength conversion device 120 is an MgO:PPLN crystal, the waveguide portion of the crystal may have dimensions (e.g., height and width) on the order of 1 to 5 microns. A pump beam 119 directed into the waveguide portion 122 of the wavelength conversion device 120 is propagated through the wavelength conversion device 120 where the fundamental wavelength of the pump beam is converted to higher order harmonics such that a wavelength-converted output beam 128 is emitted from the output facet 133 of the wavelength conversion device. In one embodiment, the pump beam 119 produced by the laser source 110 and directed into the waveguide portion 122 of the wavelength conversion device 120 has a fundamental wavelength of about 1060 nm. In this embodiment, the wavelength conversion device 120 converts the pump beam 119 to green light such that the wavelength-converted output beam 128 has a wavelength of about 530 nm. The wavelength conversion device function generally manifests a phase-matched (PM) bandwidth centered on a PM wavelength. When the pump beam 119 of the laser source has a wavelength within the PM bandwidth, the wavelength conversion device 120 efficiently converts the pump beam 119 into higher order harmonics of the fundamental wavelength such that a wavelength-converted output beam 128 is emitted from the wavelength conversion device. In the embodiments described herein, the wavelength conversion device is an MgO:PPLN device with a PM bandwidth which is a quasi-phase-matched (QPM) bandwidth such that the PM wavelength of the device is a quasi-phase-matched (QPM) wavelength. In these embodiments the QPM bandwidth is on the order of about 0.2 nm and the QPM wavelength is generally in the infrared range from about 1020 nm to about 1100 nm. However, it should be understood that wavelength conversion devices with non-QPM bandwidths and non-QPM wavelengths may be used in conjunction with the methods for reducing speckle contrast described herein.

Referring now to FIG. 1, one embodiment of a wavelength-converted light source 100 is depicted in which the optical path between the laser source 110 and the input facet of the wavelength conversion device 120 is substantially linear. In the embodiment shown in FIG. 1, the pump beam 119 emitted by the laser source 110 is coupled into a waveguide portion of the wavelength conversion device 120 with adaptive optics 140. In this embodiment, the adaptive optics 140 generally comprises an adjustable optical component, specifically a lens 142. The lens 142 collimates and focuses the pump beam 119 emitted by the laser source 110 into the waveguide portion of the wavelength conversion device 120. However, it should be understood that other types of lenses, multiple lenses, or other optical elements may be used. The lens 142 may be coupled to an actuator (not shown) for adjusting the position of the lens 142 in the x-and y-directions such that the lens 142 is an adjustable optical component. The actuator may also be operable to adjust the position of the lens in the z-direction. Adjusting the position of the lens in the x-and y-directions may facilitate positioning the pump beam 119 along the input facet of the wavelength conversion device 120 and, more specifically, on the waveguide portion of the wavelength conversion device such that the pump beam 119 is aligned with the waveguide portion and the output of the wavelength conversion device 120 is optimized.

While FIG. 1 depicts pump beam 119 emitted by the laser source 110 as being coupled into the wavelength conversion device along a substantially linear optical pathway, it should be understood that the laser source and the wavelength conversion device may be oriented such that the optical pathway between the devices is non-linear or folded. In these embodiments the adaptive optics may comprise one or more adjustable mirrors such as a MEMS mirror or similar device, which redirects the pump beam over one or more optical pathways and into the wavelength conversion device. Further it should be understood that the pump beam 119 may be directly coupled into the wavelength conversion device without the use of adaptive optics such as when the laser source and the wavelength conversion device are proximity coupled, as described above.

Still referring to FIG. 1, the wavelength-converted light source 100 may also comprise a beam splitter 180 positioned proximate the output of the wavelength conversion device 120. The beam splitter 180 is used to redirect a portion of the wavelength-converted output beam 128 emitted from the wavelength conversion device 120 into a measurement device 170. The measurement device 170 may be operable to measure the intensity and/or wavelength of the wavelength-converted output beam 128 and output an electrical signal indicative of the measured intensity and/or wavelength.

The wavelength-converted light source 100 may also comprise a source controller 150. The source controller 150 may comprise one or more micro-controllers or programmable logic controllers used to store and execute a programmed instruction set for operating the wavelength-converted light source 100. Alternatively, the micro-controllers or programmable logic controllers may directly execute a hardwired instruction set. The source controller 150 may be electrically coupled to the laser source 110, the adaptive optics 140, the heater 123 and the measurement device 170 and programmed to operate the laser source 110, the heater 123 and the adaptive optics 140. More specifically, in one embodiment, the source controller 150 may comprise drivers 152, 153, 154 for controlling the adaptive optics, the heater and the wavelength selective section of the laser source, respectively.

The adaptive optics driver 152 may be coupled to the adaptive optics 140 with leads 156, 158 and supply the adaptive optics 140 with x-and y-position control signals through the leads 156, 158, respectively. The x-and y-position control signals facilitate positioning the adjustable optical component of the adaptive optics in the x-and y-directions which, in turn, facilitates positioning the pump beam 119 of the laser source 110 on the input facet of the wavelength conversion device 120. However, it should also be understood that the adaptive optics driver 152 may also be operable to supply the adaptive optics 140 with a z-positioned control signal to adjust the position the adjustable optical component in the z-direction.

The wavelength selective section driver 154 may be coupled to the laser source 110 with lead 155. The wavelength selective section driver 154 may supply the wavelength selective section 112 of the laser source 110 with wavelength control signal(s) which facilitates adjusting the fundamental wavelength $\lambda_1$ of the pump beam 119 emitted from the output facet 118 of the laser source 110.

The heater driver 153 may be electrically coupled to the heater (not shown in FIG. 1) of the wavelength conversion device 120 with lead 157. The heater driver 153 may supply the heater thermally coupled to the wavelength conversion device 120 with current, thereby heating the heater 123 and the wavelength conversion device 120.

Further, the output of the measurement device 170 may be electrically coupled to an input of the source controller 150 with lead 172 such that the output signal of the measurement device 170 is passed to the source controller 150.

The wavelength-converted light source 100 may be coupled to a data source 160, which supplies the wavelength-converted light source 100 with an encoded data signal which may be representative of a video image, still image or the like. More specifically, the data source 160 may be coupled to the gain section of the laser source 110 via lead 162. The data source 160 may control the lasing intensity of the laser source 110 such that the output of the wavelength-converted light source 100 forms an image when projected. To control the lasing intensity of the laser source 110, the encoded data signal injects a gain current into the gain section of the laser source 110. Typically, the gain current has a frequency representative of the video image or still image of the encoded data signal such that, when the output of the wavelength-converted light source is projected (as modulated by the frequency of the gain current) the projected image is the video image or still image of the encoded data signal. Typically, the frequency of the encoded data signal is about 60 Hz which generally corresponds to the video frame rate of a projected image. Accordingly, it will be understood that the video frame rate of the light source 100 is 60 frames per second or one frame every 17 msec.

The wavelength-converted light source 100 may be operated to reduce the amount of speckle contrast in an image projected with the light source by rapidly changing the output wavelength of the light source. This may be accomplished by varying the PM wavelength of the wavelength conversion device and simultaneously changing the fundamental wavelength of the pump beam to maintain efficient wavelength conversion. This changes the wavelength of the wavelength-converted output beam emitted by the wavelength conversion device without causing significant variations in the efficiency of the wavelength conversion device. More specifically, the amount of speckle contrast in an image projected with the light source may be reduced by rapidly changing the PM wavelength of the wavelength conversion device within a time interval which is less than the integration time of an optical detector used to sense or observe the image. For example, when a human being is viewing the projected image the human eye is the optical detector. It is generally understood that the human eye has an integration time of less than about 100 milliseconds. This integration time is dependent on multiple factors including, without limitation, the specific individual, the brightness of the illumination and the wavelength of illumination. For certain individuals and illumination conditions the integration time of the eye may be as low as 10 milliseconds. Accordingly, if the wavelength of the light used to project the image is changed within a time interval having a duration which is less than the integration time of the eye, the amount of speckle perceived by the observer will be reduced.

While in the aforementioned example the human eye is the optical detector, it should be understood that similar techniques may be used to reduce the perceived amount of speckle when the optical detector observing the image is a device, such as the sensor of a camera, in which case the wavelength of the light used to project the image is changed within a time interval which is less than the integration time of the particular optical detector or sensor used to observe the projected image.

Figure 4:
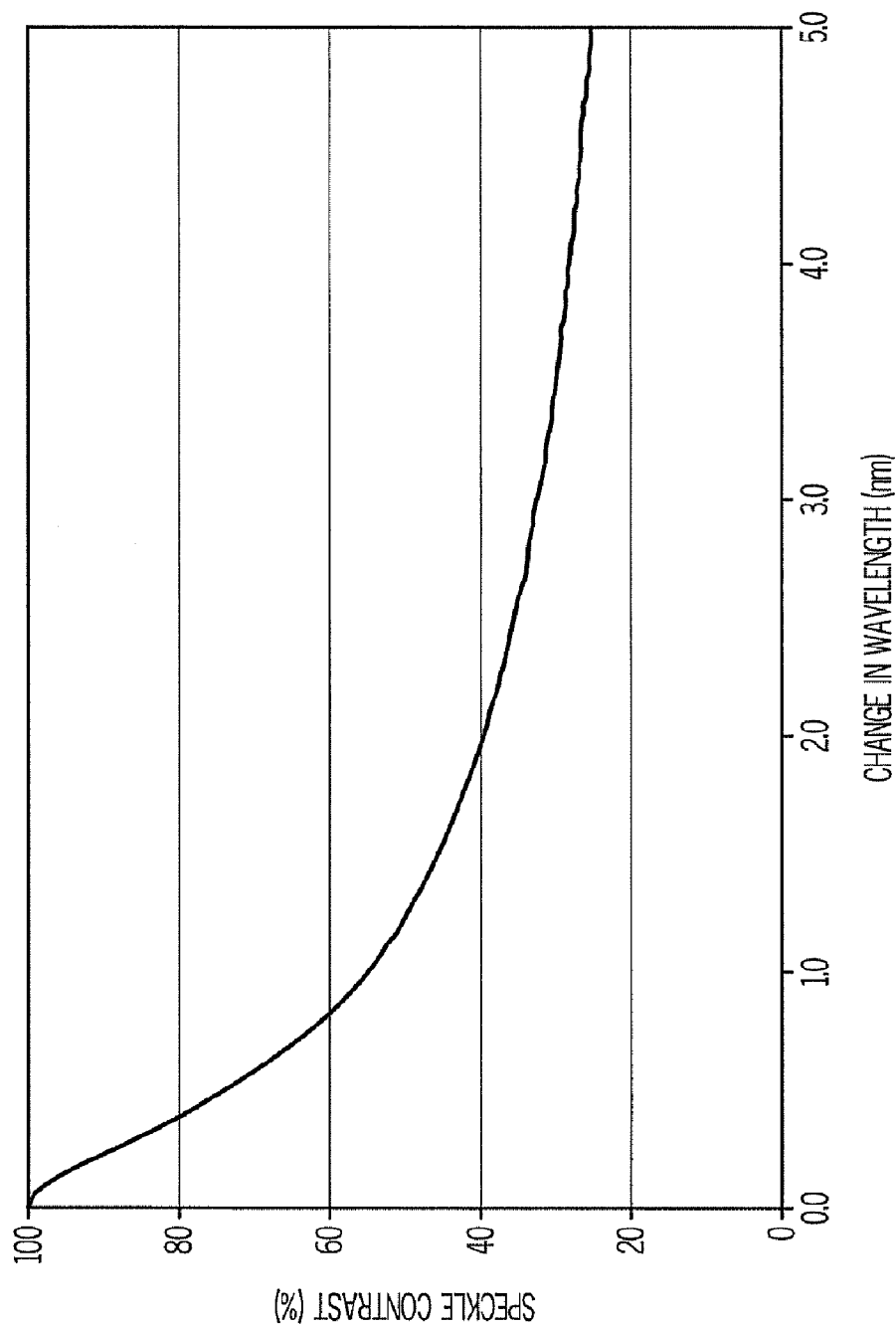
FIG. 4 graphically depicts the relationship between the change in wavelength of a wavelength-converted output beam and the corresponding change in speckle contrast.

Referring now to FIG. 4, the relationship between the change in the wavelength of wavelength converted output beam of the wavelength conversion device (x-axis) and the corresponding speckle contrast (y-axis) is graphically illustrated for an MgO:PPLN wavelength conversion device that produces a wavelength-converted output beam having a wavelength of about 530 nm from a pump beam having a wavelength of about 1060 nm (i.e., the wavelength conversion device is a frequency doubling wavelength conversion device). As shown in FIG. 4, a 1 nm change in the wavelength of the wavelength converted output beam reduces the speckle contrast in a projected image from 100% to about 50% for the green source. Total speckle in a color image results from the combination of speckle produced by each of the wavelengths used to create that image and will be reduced by an amount that is a complex function of the nature of the image and the optical detector. Further, FIG. 4 also shows that, as the magnitude of the change in wavelength increases, speckle contrast decreases. Because the wavelength conversion device is a frequency doubling wavelength conversion device, the 1 nm change in the wavelength converted output beam is facilitated by a 2 nm change in the PM wavelength of the wavelength conversion device. As described herein, the PM bandwidth of an MgO:PPLN wavelength conversion device is on the order of about 0.2 nm. Accordingly, in order to realize a significant reduction in speckle contrast (e.g., a reduction in speckle contrast to less than 50%), the PM wavelength is changed over a wavelength range of greater than 2 nm which is greater than the PM bandwidth of the wavelength conversion device. As a result, the desire for efficient frequency conversion results in a requirement that the pump wavelength be adjusted to stay within the PM bandwidth of the wavelength conversion device.

In the embodiments of the wavelength-converted light source described herein speckle contrast is reduced or mitigated by actively changing the PM wavelength of the wavelength conversion device within a time interval (i.e., the speckle reduction interval) and over a wavelength range sufficient to reduce the perceived amount of speckle contrast in a projected image. Changing the PM wavelength may be accomplished by varying a physical property of the wavelength conversion device which, in turn, changes the PM wavelength of the wavelength conversion device. The physical property of the wavelength conversion device which is varied may include the index of refraction of the wavelength conversion device at the fundamental wavelength of the pump beam, the index of refraction of the wavelength conversion device at the wavelength of the wavelength-converted output beam, the length of the wavelength conversion device and/or various combinations thereof. The methods for varying the physical property of the wavelength conversion device may include, without limitation, applying a strain to the wavelength conversion device with one or more transducers such as piezo-electric transducers, applying an electro-static field to the wavelength conversion device, or optically tuning the wavelength conversion device by adjusting the temperature of the wavelength conversion device. In the embodiments shown and described herein one or more physical properties of the wavelength conversion device are varied by heating the wavelength conversion device with the heater thermally coupled to the waveguide portion which, in turn, changes the PM wavelength of the wavelength conversion device.

Referring again to FIGS. 1-3B, to reduce the speckle contrast in an image projected with the wavelength-converted light source 100, a succession of consecutive speckle reduction intervals is established within which the PM wavelength of the wavelength conversion device will be varied. Each individual ones of the speckle reduction intervals in the succession will generally have a duration which is less than the integration time of an optical detector used to view or detect an image projected with the wavelength-converted light source, as will be described in more detail herein. To form an image with the wavelength-converted light source 100, the pump beam 119 of the laser source 110 is first directed into waveguide portion 122 on the input facet 132 of the wavelength conversion device 120 such that a wavelength-converted output beam 128 is emitted from the waveguide portion 122 of the wavelength conversion device 120 at the output facet 133. In the embodiment shown in FIG. 1, adaptive optics 140, lens 142 and the adaptive optics driver 152 are utilized to properly align the pump beam 119 with the waveguide portion 122 on the input facet 132 of the wavelength conversion device 120. The lasing intensity of the pump beam 119 of the laser source 110 may be modulated with a gain current supplied to the gain section of the laser source 110 by the data source 160 such that an image is formed with the wavelength-converted output beam 128 in the field of view of optical detector, such as a human eye, at a frame rate of 60 frames per second, as described above.

As the image is projected from the wavelength-converted light source 100, the heater driver 153 of the source controller 150 is programmed to supply the heater 123 with a current within each speckle reduction interval within the succession of consecutive speckle reduction intervals thereby heating the wavelength conversion device. As the amount of heating is varied, one or more physical properties of the wavelength conversion device is varied. For example, heating the wavelength conversion device may cause the wavelength conversion device to expand thereby changing the phase-matching period of the wavelength conversion device which, in turn, changes the PM wavelength of the device. Further, the indices of refraction of the wavelength conversion device at the fundamental wavelength of the pump beam and the wavelength of the wavelength-converted output beam are temperature-dependent. Accordingly, heating the wavelength conversion device changes the indices of refraction of the device which, in turn, changes the PM wavelength of the device. It has been observed that the PM wavelength of an MgO:PPLN wavelength conversion device has a temperature dependence on the order of about 0.1 nm/° C. such that heating the wavelength conversion device by 1° C. increases the PM wavelength by 0.1 nm. For example, in order to change the PM wavelength by 1 nm, the waveguide portion of the wavelength conversion device must be heated by at least about 10° C.

As noted hereinabove, optical detectors typically average light or images received over a particular time period or integration time. In order to reduce the perceived amount of speckle contrast the PM wavelength of the wavelength conversion device may be changed within individual ones of the speckle reduction intervals. Accordingly, it will be understood that the speckle reduction intervals generally have duration which is less than the integration time of the optical detector and the source controller 150 is programmed to vary the physical property of the wavelength conversion device (and therefore change the PM wavelength of the wavelength conversion device) within individual ones of the speckle reduction intervals.

For example, where the optical detector is a human eye with an integration time of less than about 100 msec, the source controller 150 is programmed to change the PM wavelength of the wavelength conversion device within a speckle reduction interval having a duration of less than 100 msec. To change the PM wavelength, the source controller 150 supplies a current to the heater via lead 157 thereby heating the wavelength conversion device 120 and, more specifically, the waveguide portion 122 of the wavelength conversion device. In one embodiment, the amount by which the wavelength conversion device 120 is heated to a temperature sufficient to cause a change in the PM wavelength which produces a corresponding reduction in speckle contrast to less than 50% and, more preferably, to less than 40%. For a wavelength-converted light source comprising an MgO:PPLN wavelength conversion device which produces a wavelength-converted output beam having a wavelength of about 530 nm, a change in the PM wavelength of greater than about 0.5 nm, more preferably greater than about 1 nm, and, most preferably greater than about 2 nm produce sufficient reduction in the speckle contrast. Accordingly, for a wavelength conversion device with a temperature dependence of 0.1 nm/° C., this corresponds to heating the wavelength conversion device to provide an increase in temperature of about 20° C.

In the foregoing example the physical property of the wavelength conversion device is varied by heating the wavelength conversion device within each speckle reduction interval of a succession of consecutive speckle reduction intervals where the duration of each interval is less than the integration time of the optical detector which, in the example, is 100 msec. In other embodiments the duration of each speckle reduction interval may be less than the frame rate of a projection or imaging system in which the wavelength-converted light source is incorporated. For example, when the frame rate of the projector is 60 Hz, the duration of each speckle reduction interval may be less than about 17 msec.

As described herein, the physical property of the wavelength conversion device is varied within a particular speckle reduction interval which is less than the integration time of an optical detector. However, within that speckle reduction interval, the physical property may be periodically varied or non-periodically varied. For example, the source controller 150 may be programmed such that the heater driver 153 randomly supplies the heater with a current sufficient to raise the temperature of the wavelength conversion device within the speckle reduction interval. Alternatively, the source controller 150 may be programmed such that the heater driver 153 periodically supplies the heater with a current sufficient to raise the temperature of the wavelength conversion device within the speckle reduction interval. Further, the amount of current supplied to the heater (and therefore the magnitude of change in the PM wavelength) may be the same each time the wavelength conversion device is heated or may be varied each time the wavelength conversion device is heated.

In another embodiment, each speckle reduction interval in the succession of consecutive speckle reduction intervals ends (and the next consecutive speckle reduction interval begins) after the physical property of the wavelength conversion device has been varied within the speckle reduction interval. For example, in one embodiment, the wavelength conversion device may be heated within a particular speckle reduction interval thereby changing the PM wavelength within the interval. After the heating cycle ends, or, alternatively, after the PM wavelength has been changed, the current speckle reduction interval ends and the next consecutive speckle reduction interval begins.

Referring to the embodiment of the wavelength conversion device 121 shown in FIG. 3B, the wavelength conversion device 121 may be thermally coupled to a heat sink 127 which facilitates rapidly cooling the wavelength conversion device 121 following heating with the heater. Cooling of the wavelength conversion device 121 following heating induces a corresponding change in the PM wavelength of the wavelength conversion device further contributing to the reduction in speckle. The heat sink may be in contact with only the waveguide portion 122, as shown in FIG. 3B, or cover the wavelength conversion device.

Still referring to FIGS. 1-3B, the fundamental wavelength of the pump beam 119 of the laser source 110 is generally tuned to the PM wavelength of the wavelength conversion device and/or within the corresponding PM bandwidth where efficient wavelength conversion of the pump beam occurs within the wavelength conversion device (i.e., when the fundamental wavelength of the pump beam 119 is within the PM bandwidth the intensity of the wavelength-converted output beam 128 is maximized). However, in order to reduce speckle, the PM wavelength is changed by an amount which is generally greater than the PM bandwidth. Therefore, as the PM wavelength is changed, the fundamental wavelength of the pump beam 119 must be adjusted to follow the change in the PM wavelength and the corresponding shift in the PM bandwidth.

In one embodiment, as the PM wavelength is changed, the source controller is programmed to monitor the resulting change in the intensity of the wavelength-converted output beam 128 with the measurement device 170. For example, a portion of the wavelength-converted output beam 128 is diverted into the measurement device 170 by the beam splitter 180. The measurement device 170 is operable to output an electrical signal indicative of the intensity of the wavelength-converted output beam 128 to the source controller 150 via lead 172. The source controller 150 is programmed to monitor changes in the electrical signal from the measurement device over time. When the source controller 150 determines that the intensity of the wavelength-converted output beam 128 has decreased, the source controller 150 determines the magnitude of the change in the PM wavelength of the wavelength conversion device based on the change in intensity of the wavelength-converted output beam. The source controller 150 is programmed to determine a wavelength control signal based on the magnitude of the change in intensity in the wavelength-converted output beam and supply the wavelength control signal to the wavelength selective section 112 of the laser source 110 with wavelength selective section driver 154 thereby adjusting the fundamental wavelength of the pump beam 119 to follow the change in the PM wavelength and restoring or maintaining the conversion efficiency of the wavelength conversion device. As the wavelength conversion device 120 is heated (i.e., when current is applied to the heater), the source controller 150 supplies the wavelength control signal to the wavelength selective section 112 of the laser source 110 such that the fundamental wavelength of the pump beam 119 is increased. Alternatively, as the wavelength conversion device 120 is cooling (i.e., when the current applied to the heater is reduced or no current is applied to the heater), the source controller 150 is programmed to supply the wavelength control signal to the wavelength selective section 112 of the laser source 110 such that the fundamental wavelength of the pump beam 119 is decreased.

In an alternative embodiment, the source controller 150 supplies the wavelength selective section 112 of the laser source 110 with a wavelength control signal that is based upon the current supplied to the microstrip heater and the time duration which the current is supplied to the microstrip heater. For example, the source controller may be pre-programmed with a look-up table containing various values for the wavelength control signal indexed according to the magnitude of the current supplied to the microstrip heater and the timer duration which the current is supplied to the microstrip heater. Alternatively, the source controller 150 may be programmed to calculate a value for the wavelength control signal based on the magnitude of the current supplied to the microstrip heater and the timer duration which the current is supplied to the microstrip heater.

The process of changing the PM wavelength by varying a physical property of the wavelength conversion device within a speckle reduction interval and adjusting the fundamental wavelength of the pump beam based on the changes in the PM wavelength is repeated as the wavelength-converted light source is used to project an image within the field of view of an optical detector. As described hereinabove, changing the PM wavelength of the wavelength conversion device causes a corresponding change in the wavelength of the wavelength-converted output beam of the wavelength conversion device which may be sufficient to reduce the perceived amount of speckle contrast in an image projected with the wavelength-converted light source.

In one embodiment (not shown), the methods described herein may be used in conjunction with a wavelength conversion device which comprises a plurality of waveguide components, such as the wavelength conversion device described in U.S. Patent Publication No. 2009/0110013 filed Oct. 30, 2007 and entitled "MULTI-COMPONENT WAVELENGTH CONVERSION DEVICES AND LASER SOURCES COMPRISING THE SAME." In one embodiment, individual ones of the waveguide components may have different PM wavelengths such that each waveguide produces a wavelength converted output beam having a different wavelength. In another embodiment, individual ones of the waveguide components may have the same PM wavelengths. The laser source may be directed into a selected waveguide and switched between waveguides using adaptive optics similar to the adaptive optics described hereinabove. To facilitate the use of the methods for reducing speckle contrast described herein a physical property of the waveguide components may be varied which, in turn, changes the phase matching wavelength of the waveguide components. For example, the waveguides of the wavelength conversion device may be thermally coupled to a microstrip heater. In one embodiment a single microstrip heater is thermally coupled to each of the plurality of waveguides. In another embodiment, each waveguide may be individually coupled to a separate micro strip heater. As the pump beam of the laser source is moved from waveguide to waveguide, each waveguide may be heated (either to the same temperature or different temperatures) such that the PM wavelength of the waveguide is changed overtime. Varying a physical property of the wavelength conversion device may be performed within individual ones of a succession of speckle reduction time intervals, as described hereinabove, thereby changing the phase matched wavelength of the wavelength conversion device. Further, it should be understood that the wavelength of the wavelength converted output beam may be selected by selecting the specific waveguide component which the laser source is coupled to and an amount by which a physical property of the wavelength conversion device (such as the temperature of the waveguide component) is varied. The fundamental beam of the laser source may be switched between individual ones of the waveguide components within individual ones of the speckle reduction intervals thereby changing the wavelength of the wavelength converted output beam emitted from the wavelength conversion device. Further, the fundamental beam of the wavelength conversion device may be changed based on the change in the PM wavelength of the wavelength conversion device.

Wavelength-converted light sources utilizing the methods for reducing speckle described herein may be used in conjunction with various imager systems to improve the quality of images projected with the imager systems. For example, the wavelength-converted light sources may be utilized in imager systems such as digital light processing (DLP) imagers or liquid-crystal-on-silicon (LCOS) imagers. In these imager systems the red, green, and blue light sources sequentially illuminate the entire image at one time and the imager spatially varies the amount of light emitted into each pixel thereby forming the projected image. When such imaging techniques are utilized the speckle caused by wavelength-converted light sources incorporated in the imager (i.e., the red light source, the green light source, or the blue light source, as the case may be) may be reduced by changing the PM wavelength of the wavelength-converted light source either within a single projected frame (i.e., within a speckle reduction interval of less than 17 msec) or within a speckle reduction interval covering a small number of sequential frames so long as the total time interval within which the PM wavelength is changed is less than the integration time of the optical detector which, in this case, is the human eye. When the PM wavelength of the wavelength-converted light sources are changed in this manner, the human eye integrates the projected information over several frames such that the perceived amount of speckle in the projected image is reduced and/or substantially mitigated.

Further, wavelength-converted light sources utilizing the methods for reducing speckle described herein may also be used in conjunction with imaging systems which use a raster-scan approach to image formation. In this approach the red, blue and green light sources of the imaging system are rapidly scanned over the screen and the intensity of each beam is varied during the scan to portray the image content at each pixel. Accordingly, each pixel in the projected image is only illuminated for a brief period of time which is typically from about 10 to 20 nanoseconds. This time period is generally shorter than the time interval in which a physical property of the wavelength conversion device can be varied to effect a change in the PM wavelength of the wavelength conversion device. Therefore, for imaging systems which utilize the raster-scan approach, the PM wavelength of the wavelength conversion device is varied over a number of sequential frames (rather than within a single frame) such that, for a single wavelength-converted light source, each pixel is illuminated with different wavelengths over a number of frames whose total duration is less than the integration time of the human eye.

It should now be understood that the methods for operating a wavelength-converted light source described herein may be used to reduce speckle in an image projected with the wavelength-converted light source without requiring any additional optical components or devices other than the heater coupled to the wavelength conversion device. Accordingly, the methods described herein will not significantly add to the size of existing devices. Moreover, implementing the methods for reducing speckle described herein requires very little power for heating the wavelength conversion device and tuning the laser source and, as such, the methods may be easily incorporated into existing wavelength-converted light source designs without significant modification. Further, in the case of a raster-scanned image projection system, the methods described herein will not degrade the infinite depth-of-focus of the wavelength-converted light source.

It is noted that specific embodiments described herein relate to methods of operating a light source to reduce speckle which are used in conjunction with wavelength-converted light sources incorporating an MgO:PPLN crystal wavelength conversion devices. In these embodiments the wavelength conversion devices are described as converting an infrared beam of approximately 1060 nm to a second-order harmonic having a wavelength of approximately 530 nm. However, it should be understood that the methods described herein may also be used with other wavelength-converted light sources employing different non-linear optical materials, different-order harmonics and/or different wavelengths of the pump beam and/or wavelength-converted output beam.

It will be apparent to those skilled in the art that various modifications and variations can be made to the present invention without departing from the spirit and scope of the invention. Thus it is intended that the present invention covers the modifications and variations of this invention provided they come within the scope of the appended claims and their equivalents.

What is claimed is:

1. A method for operating a light source comprising a laser source optically coupled to a wavelength conversion device, the method comprising:
   directing a pump beam having a fundamental wavelength from the laser source into an input facet of the wavelength conversion device such that the wavelength conversion device emits a wavelength-converted output beam from an output facet of the wavelength conversion device in a field of view of an optical detector;
   varying a physical property of the wavelength conversion device within individual ones of a succession of consecutive speckle reduction intervals, wherein individual speckle reduction intervals have a duration which is less than an integration time of the optical detector and the physical property of the wavelength conversion device is varied to effect a change in a phase-matched (PM) wavelength of the wavelength conversion device; and
   adjusting the fundamental wavelength of the pump beam based on the change in the PM wavelength of the wavelength conversion device to maintain efficient wavelength conversion in the wavelength conversion device.

2. The method of claim 1 wherein the phase-matched wavelength of the wavelength conversion device is a quasi-phase-matched (QPM) wavelength of the wavelength conversion device.

3. The method of claim 1 wherein varying the physical property of the wavelength conversion device changes the PM wavelength of the wavelength conversion device by at least about 0.5 nm.

4. The method of claim 1 wherein the change in the PM wavelength reduces a speckle contrast of an image formed by the wavelength-converted output beam.

5. The method of claim 1 wherein the physical property is periodically varied within individual speckle reduction intervals.

6. The method of claim 1 wherein the physical property is non-periodically varied within individual speckle reduction intervals.

7. The method of claim 1 wherein an individual speckle reduction interval ends after the physical property of the wavelength conversion device is varied.

8. The method of claim 1 wherein individual ones of the succession of speckle reduction intervals is less than about 100 msec.

9. The method of claim 1 wherein individual ones of the succession of speckle reduction intervals is less than about 17 msec.

10. The method of claim 1 wherein the physical property is selected from the list consisting of an index of refraction of the wavelength conversion device at the fundamental wavelength, an index of refraction of the wavelength conversion device at a wavelength of the wavelength-converted output beam, a length of the wavelength conversion device or combinations thereof.

11. The method of claim 1 wherein the physical property is varied by heating the wavelength conversion device.

12. The method of claim 11 wherein the wavelength conversion device is heated with a microstrip heater.

13. The method of claim 1 further comprising monitoring a change in intensity of the wavelength-converted output beam due to the change in the PM wavelength of the wavelength conversion device.

14. The method of claim 13 wherein the fundamental wavelength of the pump beam is adjusted by supplying a control signal to the laser source, wherein the control signal is based on the change in intensity of the wavelength-converted output beam.

15. The method of claim 1 wherein the laser source is a Distributed Bragg reflector (DBR) laser source comprising a wavelength selective section.

16. The method of claim 1 wherein the wavelength conversion device is a periodically poled lithium niobate (PPLN) second harmonic generator (SHG) optical crystal.

17. The method of claim 1 wherein:
   the wavelength-converted output beam of the wavelength conversion device forms an image; and
   the physical property of the wavelength conversion device is varied to reduce a speckle contrast of the image.

18. The method of claim 1 wherein:
   the wavelength-converted output beam of the wavelength conversion device is modulated to form an image comprising a plurality of sequential frames; and
   the physical property of the wavelength conversion device is varied over a plurality of the sequential frames of the image.

19. The method of claim 1 wherein:
   the wavelength conversion device comprises a plurality of waveguide components;
   the PM wavelength of at least one of the waveguide components is changed by varying the physical property of the wavelength conversion device; and
   the pump beam of the laser source is switched between individual ones of the waveguide components within individual ones of the succession of consecutive speckle reduction intervals.

20. The method of claim 1 wherein:
   the wavelength-converted output beam of the wavelength conversion device is modulated to form an image or sequence of images comprising a time sequence of frames; and
   the physical property of the wavelength conversion device is varied during each frame of the image to reduce the speckle contrast in the image.

21. The method of claim 1 wherein:
   the wavelength-converted output beam of the wavelength conversion device is modulated to form an image or sequence of images comprising a time sequence of frames; and
   the physical property of the wavelength conversion device is varied over a plurality of frames of the image to reduce the speckle contrast in the image.

22. A method for operating a light source comprising a laser source optically coupled to a wavelength conversion device, the method comprising:
- directing a pump beam having a fundamental wavelength from the laser source into an input facet of the wavelength conversion device such that the wavelength conversion device emits a wavelength-converted output beam from an output facet of the wavelength conversion device in a field of view of an optical detector;
- heating the wavelength conversion device within individual ones of a succession of consecutive speckle reduction intervals, wherein individual speckle reduction intervals have a duration which is less than an integration time of the optical detector and the wavelength conversion device is heated to affect a change in a phase-matched (PM) wavelength of the wavelength conversion device; and
- adjusting the fundamental wavelength of the pump beam based on the change in the PM wavelength of the wavelength conversion device to maintain an efficiency of a wavelength conversion in the wavelength conversion device.

* * * * *